United States Patent
Hamaguchi (10) Patent No.: US 8,458,423 B2
(45) Date of Patent: Jun. 4, 2013

(54) DATA PROCESSING APPARATUS AND DATA PROCESSING METHOD OF DATA PROCESSING APPARATUS

(75) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 13/164,264

(22) Filed: Jun. 20, 2011

(65) Prior Publication Data

US 2011/0320748 A1   Dec. 29, 2011

(30) Foreign Application Priority Data

Jun. 25, 2010 (JP) ................. 2010-145144

(51) Int. Cl.
G06F 12/14 (2006.01)
G06F 21/00 (2006.01)

(52) U.S. Cl.
USPC .................... 711/163; 711/154; 711/E12.091

(58) Field of Classification Search
None
See application file for complete search history.

(56) References Cited

U.S. PATENT DOCUMENTS

| 2008/0282264 A1 | 11/2008 | Chen |
| 2009/0067079 A1 | 3/2009 | Al-Azzawi |
| 2010/0131731 A1* | 5/2010 | Yamamoto et al. ........... 711/163 |
| 2012/0036347 A1* | 2/2012 | Swanson et al. ................. 713/2 |

FOREIGN PATENT DOCUMENTS

| EP | 1775881 A1 | 4/2007 |
| JP | 2008-148226 A | 6/2008 |
| WO | WO 02/05098 A1 | 1/2002 |

* cited by examiner

*Primary Examiner* — Edward Dudek, Jr.
*Assistant Examiner* — Ralph A Verderamo, III
(74) *Attorney, Agent, or Firm* — Canon USA, Inc., IP Division (57) ABSTRACT

When one of a plurality of storage units is not available, execution of operation modes can be switched according to an option status. A data processing apparatus that can respectively store data to a first storage unit and a second storage unit, includes a control unit configured to execute a first operation mode for limiting data processing using the second storage unit and enabling data processing using the first storage unit in a case where the second storage unit is not available and an option for storing encrypted data in the second storage unit is not used, and execute a second operation mode for limiting the data processing using the first storage unit and the data processing using the second storage unit, in a case where the second storage unit is not available and the option is used.

10 Claims, 9 Drawing Sheets

| NO. | OPTION INFORMATION | STATUS | NO. | OPTION INFORMATION | STATUS |
|---|---|---|---|---|---|
| 1 | FileSharePackage | 0 | 34 | TimeStampPdfPackage | 0 |
| 2 | ColorScanPackage | 0 | 35 | ERDS3rdPartyPackage | 0 |
| 3 | PSPackage | 0 | 36 | JDFPackage | 0 |
| 4 | PCLPackage | 0 | 37 | FuncComposerPackage | 0 |
| 5 | NetwarePackage | 0 | 38 | VoiceASRPackage | 0 |
| 6 | PullScanPackage | 0 | 39 | HardwareEncryptSecurePackage | 0 |
| 7 | SendPackage | 0 | 40 | HddClearPackage | 0 |
| 8 | RemoteCopySendPackage | 0 | 41 | PowerOn24HPackage | 0 |
| 9 | RemoteCopyReceivePackage | 0 | 42 | IPsecPackage | 0 |
| 10 | DMSPackage | 0 | 43 | PCAMPackage | 0 |
| 11 | JavaPackage | 0 | 44 | MemoryMediaPrintPackage | 0 |
| 12 | EncryptPdfPackage | 0 | 45 | MemoryMediaScanPackage | 0 |
| 13 | G3FaxPackage | 0 | 46 | XPSPackage | 0 |
| 14 | G4FaxPackage | 0 | 47 | AiRFAXClientPackage | 0 |
| 15 | OcrPdfPackage | 0 | 48 | AiRFAXServerPackage | 0 |
| 16 | SoftwareEncryptSecurePackage | 0 | 49 | OOXMLPackage | 0 |
| 17 | SecurityKitPackage | 0 | 50 | LinearizedPackage | 0 |
| 18 | LIPSPackage | 0 | 51 | ReaderExtentionPackage | 0 |
| 19 | PDFDirectPackage | 0 | 52 | PolicyServerPackage | 0 |
| 20 | VoiceTTSPackage | 0 | 53 | PdfAPackage | 0 |
| 21 | WebPackage | 0 | 54 | PdfSignVisiblePackage | 0 |
| 22 | VNCPackage | 0 | 55 | XPSDirectPackage | 0 |
| 23 | USBPrintPackage | 0 | 56 | MobileCoopPackage | 0 |
| 24 | WebPDFDirectPackage | 0 | 57 | MobileCoopPrintPackage | 0 |
| 25 | EncryptSecureCCCPackage | 0 | 58 | MobileCoopAddressPackage | 0 |
| 26 | ExtLanguagePackage | 0 | 59 | HddOptPackage | 0 |
| 27 | MeapOcrPdfPackage | 0 | 60 | OpenIfPackage | 0 |
| 28 | PAFPackage | 0 | 61 | BarDIMMPackage | 0 |
| 29 | iRTrustStampPackage | 0 | 62 | HDDMirrorPackage | 0 |
| 30 | ACQPackage | 0 | 63 | PCAMMdsBoardPackage | 0 |
| 31 | ScalablePdfPackage | 0 | 64 | IslotWlanPackage | 0 |
| 32 | UserSignedPdfPackage | 0 | 65 | JobHoldPackage | 0 |
| 33 | MachineSignedPdfPackage | 0 | 66 | WebImagingPackage | 0 |

DATA PROCESSING APPARATUS AND DATA PROCESSING METHOD OF DATA PROCESSING APPARATUS

BACKGROUND OF THE INVENTION

1. Field of the Invention

The present invention relates to a data processing apparatus that performs data processing by using a plurality of storage devices.

2. Description of the Related Art

Recently, there is an increase in number of apparatuses using a semiconductor storage device such as a flash memory so-called a solid state drive (SSD), in place of a hard disk (HDD). The SSD is highly resistant to the vibration or shock. On the other hand, the SSD is expensive for a unit of capacity. When a large capacity is needed, an HDD is used. Thus, the usage of a storage device is determined according to characteristics of the storage device.

Further, recently, there has been an apparatus having a function for encrypting user data stored in the storage device, as a security function. For example, an image forming apparatus has a function for protecting data without reduction in speed when storing personal information, such as document image data or an address book, stored by a user in a device via a data processing apparatus that can encrypts/decrypts data.

On such a background, an information processing apparatus having both the SSD and the HDD generally stores a system program or initial data required for activation on the SSD side, and encrypts and stores user data on the HDD side.

When operating under an environment in which security is taken into consideration, data is generally encrypted via an encryption device in an HDD device or connected to an interface unit in the HDD to prevent the reduction in processing speed for encryption.

When the operation of the HDD is interrupted due to a malfunction, it is demanded to be capable of continuing minimum image-formation operation without suspending a system in the image forming apparatus by suspending only the use of the HDD.

For example, Japanese Patent Application Laid-Open No. 2008-148226 discusses an image forming apparatus which enters any of the following modes to reduce the number of accesses to the HDD when it is determined, based on self-diagnosis information of the HDD, that the HDD will soon break down. The modes include HDD degeneration operation modes such as an HDD read-only mode, a mode without using the HDD, an HDD OFF-power mode, and a data collect mode in the case of HDD expansion.

Further, in the image forming apparatus discussed in Japanese Patent Application Laid-Open No. 2008-148226, a failure of the HDD is detected and, and when it is detected that the HDD is not available, the apparatus can be operated in the mode without using the HDD.

However, when the image forming apparatus is operating using an encryption device under an environment in which security is taken into consideration, and when the image forming apparatus is activated in the mode without using the HDD, then processing to write temporary data into alternative storage device mounted on the image forming apparatus.

In an image forming apparatus using an SSD as the alternative storage device, data is recorded without encrypting the data passing through the encryption device. Under such a state, by detaching the SSD from the image forming apparatus and reading contents in the SSD, user information such as image data or an address book can be stolen, and the security level of the user information deteriorates.

SUMMARY OF THE INVENTION

The present invention is directed to a data processing apparatus and a data processing method of the data processing apparatus capable of switching the execution of operation modes depending on the option status when one of a plurality of storage devices is not available.

According to an aspect of the present invention, a data processing apparatus that can respectively store data to a first storage unit and a second storage unit, includes a control unit configured to execute a first operation mode for limiting data processing using the second storage unit and enabling data processing using the first storage unit in a case where the second storage unit is not available and an option for storing encrypted data in the second storage unit is not used, and execute a second operation mode for limiting the data processing using the first storage unit and the data processing using the second storage unit, in a case where the second storage unit is not available and the option is used.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a management table stored in a nonvolatile random access memory (RAM).

DESCRIPTION OF THE EMBODIMENTS

Various exemplary embodiments, features, and aspects of the invention will be described in detail below with reference to the drawings.

Figure 1:
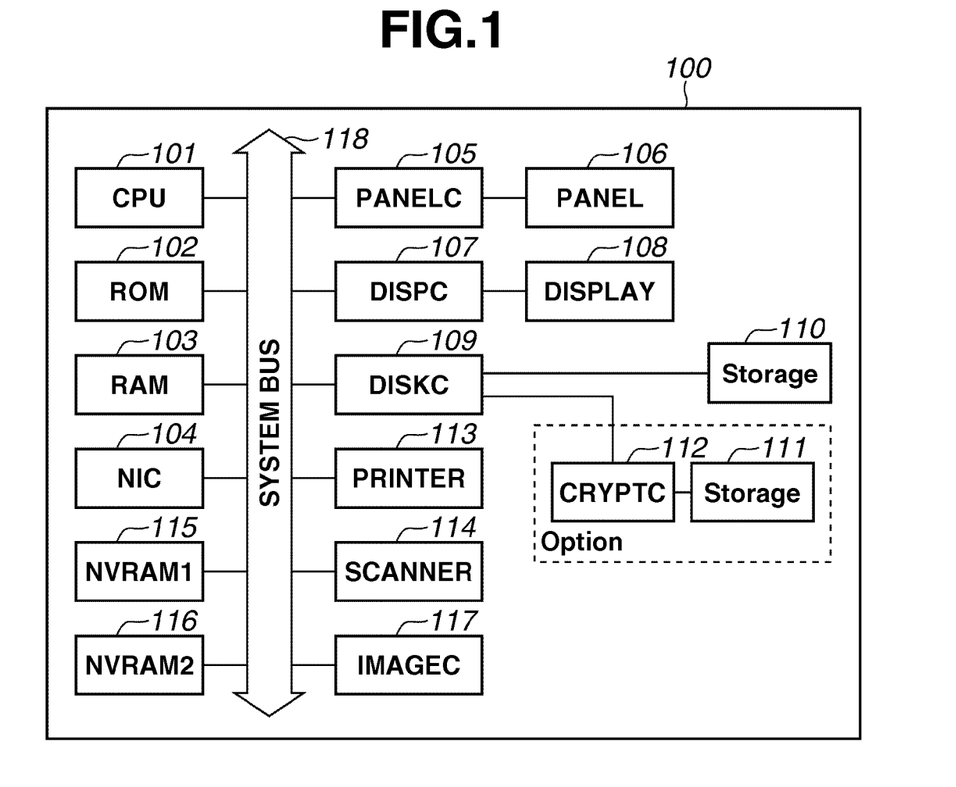
FIG. 1 is a block diagram illustrating a configuration of an image forming apparatus.

FIG. 1 is a block diagram illustrating a configuration of an image forming apparatus according to a first exemplary embodiment of the present invention. According to the first exemplary embodiment, a description is given on the image forming apparatus as a data processing apparatus having a plurality of storage devices. However, the present invention can be applied to data processing apparatuses other than the image forming apparatus.

In FIG. 1, an image forming apparatus 100 includes a CPU 101 that executes software stored in a read only memory (ROM) 102, a storage 110, or a storage 111. The image forming apparatus 100 processes various jobs in a plurality of operation modes. The type of job includes a print job, a copy job, and a data transfer job.

The CPU 101 integrally controls devices connected to a system bus 118. In the present exemplary embodiment, a plurality of nonvolatile storage devices can be connected to the image forming apparatus 100. As an option, the storage 111 and an encryption controller (CRYPTC) 112 can be connected to the image forming apparatus 100.

The storage 110 and the storage 111 are controlled in reading and writing by a disk controller 109. Hereinbelow, a description is given on a memory system in which the storage 110 includes a nonvolatile semiconductor storage device such as a solid state drive (SSD) and the storage 111 includes a nonvolatile storage device such as a hard disk drive (HDD). In the present exemplary embodiment, a description is given by setting the storage 110 is first storage means and setting the storage 111 is second storage means.

The storage 110 and the storage 111 are used also as a storage area for temporarily storing image data. The RAM 103 functions as a main memory or a work area of the CPU 101. An external input controller (PANELC) 105 controls an instruction input from various buttons or a touch panel 106 provided on the image forming apparatus 100.

A display controller (DISPC) 107 controls the display of a display module (DISPLAY) 108 including a liquid crystal display. A network interface card (NIC) 104 interactively receives and transmits data from/to another network device or a file server.

A printer 113 is configured by an electrophotographic or inkjet system, and prints data on a sheet. A scanner 114 reads an image printed on the sheet. In many cases, an auto document feeder (not illustrated) is attached as an option to the scanner 114, and the scanner 114 automatically reads data on a plurality of documents conveyed by the auto document feeder.

A nonvolatile RAM (NVRAM) 115 is a low speed nonvolatile memory with a medium size capacity, which stores various setting information and license information set to the image forming apparatus 100. A nonvolatile RAM (NVRAM) 116 is a high speed nonvolatile memory with a small capacity, which stores an activation mode and error information set to the image forming apparatus 100. The activation mode is specifically described below with reference to FIG. 4.

An image controller (IMAGEC) 117 processes image data on the RAM 103 in the image forming apparatus 100, and outputs the data to the RAM 103. Image processing includes processing such as rotation, zoom, color space conversion, gray-scale conversion, combination, coding, and decoding.

Figure 2:
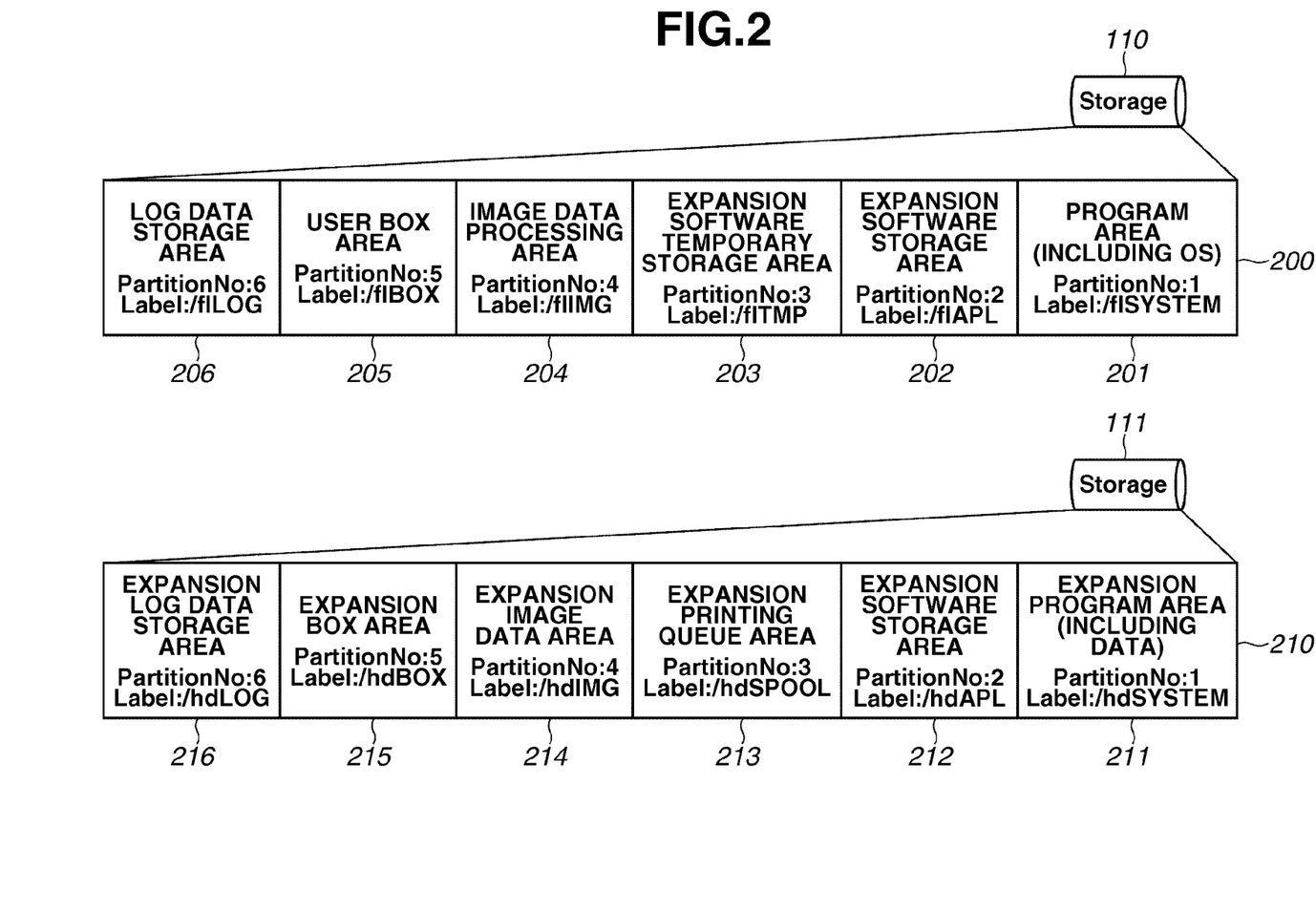
FIG. 2 is a diagram illustrating a configuration of storage areas in nonvolatile storage devices in FIG. 1.

FIG. 2 is a diagram illustrating a configuration of storage areas in the nonvolatile storage devices in FIG. 1. In an example in FIG. 2, the entire areas in the storages 110 and 111 are to be used, however, when the storage 111 exists, apart of the area in the storage 110 may not be used.

An entire storage area 200 in the storage 110 is divided into a plurality of areas (partitions) and used according to purposes. The storage area 200 is divided into a program area 201, an expansion software storage area 202, an expansion software temporary storage area 203, an image data processing area 204, a user box area 205, and a log data storage area 206.

An entire storage area 210 in the storage 111 is similarly divided into a plurality of areas (partitions) and used according to purposes. The entire storage area 210 is divided into an expansion program area 211, an expansion software storage area 212, an expansion print queue area 213, an expansion image data area 214, an expansion box area 215, and expansion log data storage area 216.

The program area 201 and the expansion program area 211 store programs including an OS or resource data such as dictionaries or languages. The expansion software storage area 202 and the expansion software storage area 212 store software programs that realize additional functions. The program and software storage areas are used by the system and do not store user data.

The expansion software temporary storage area 203 is for temporarily creating a file when executing the expansion software. The expansion print queue area 213 is for temporarily storing print data received by the network interface card (NIC) 104.

The image data processing area 204 and the expansion image data area 214 are for temporarily storing an image processing result of image data to be printed. The user box area 205 and the expansion box area 215 are for storing image data stored by the user. The log data storage area 206 and the expansion log data storage area 216 are for logging of a job status or a program operation status.

The storages 110 and 111 are divided into the partitions according to purposes, and used. An area for storing data created by a user therein includes eight areas such as the expansion software temporary storage area 203, expansion print queue area 213, image data processing area 204, expansion image data area 214, user box area 205, expansion box area 215, log data storage area 206, and expansion log data storage area 216.

Therefore, in the security operation, when registering a file to the storage areas or updating the file in the storage areas, a data portion of the file needs to be encrypted without fail.

FIG. 3 is a management table (license management table) stored in the nonvolatile RAM (NVRAM1) 115 in FIG. 1. In the present exemplary embodiment, the NVRAM 115 stores, in nonvolatile manner, the following information as information indicating whether an option for encrypting data is valid or invalid when storing the data in the storage 111. Further, the CPU 101 refers to the information according to a procedure in FIG. 6, which will be described below.

Referring to FIG. 3, a management table 300 includes information such as a serial number 301, option information 302, and a status 303. The serial number 301 is just a serial number to be used for simply managing options. The option information (operation option) 302 is an ID for the management to identify the options.

The status 303 is a flag indicating whether the option is validated and whether the image forming apparatus 100 is a model having a sufficient memory capacity or hardware for using the option, or a flag indicating whether the license of the option is validated. When the flag is "0", the status 303 indicates that the option is not operated. When the flag is "1", the status 303 indicates that the option is operated or the license of the option is valid.

Depending on whether the specific option is valid, it is determined whether the image forming apparatus 100 is under the security operation. In the present exemplary embodiment, the security operation means that the software encryption option 304 or the hardware encryption option 305 is valid.

In order to validate the hardware encryption option 305, such conditions need to be satisfied that the encryption controller (CRYPTC) 112 is connected and operated, the hard disk option 306 is validated, and an encryption license (not illustrated) is installed.

Figure 4:
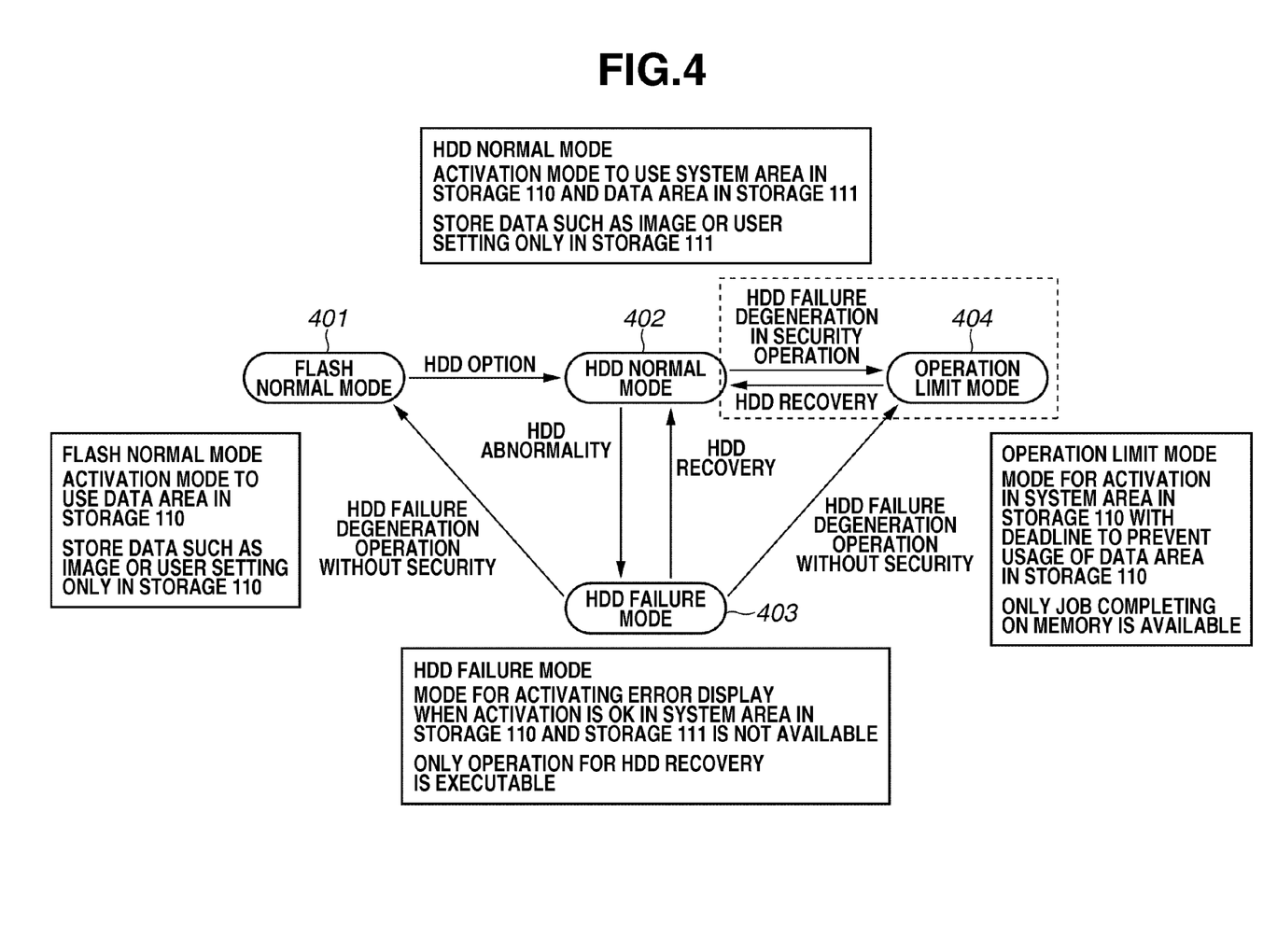
FIG. 4 is a diagram illustrating an activation mode of the image forming apparatus.

Next, features of the present exemplary embodiment will be described. FIG. 4 is a diagram illustrating an activation mode of the image forming apparatus 100. According to the present exemplary embodiment, a mode 401 is described as an example of a first operation mode, and a mode including the modes 403 and 404 is described as an example of a second operation mode. The mode 402 is described as an operation mode in which the storage 111 is available.

When activating the image forming apparatus 100, the CPU 101 refers to the nonvolatile RAM (NVRAM) 116 to determine the activation mode. If the activation is suspended until ending the initialization of the license information or the hardware, the activation time period is prolonged and the operability or usability of the user deteriorates. Therefore, the activation mode is determined by referring to the NVRAM 116. The NVRAM 116 stores activation mode information indicating one of the modes 401 to 404 illustrated in FIG. 4.

After normally activating the image forming apparatus 100, the CPU 101 reads the information in the NVRAM 115, and sets the activation mode information for the next activation in advance. When the image forming apparatus 100 is first activated, the activation mode information indicates a default mode (e.g., mode 401 or mode 402) according to the status of the option.

The mode 401 is a FLASH normal mode in which only the storage 110 including the SSD is used to be operated in the present exemplary embodiment. When the activation mode information indicates the mode 401, the image forming apparatus 100 uses only the storage 110 as the system area and the data area.

In the mode 401, if detecting that there is the storage 111 including the HDD, the CPU 101 performs the activation processing by assuming that there is not the storage 111. In the mode 401, data of image data or user setting is stored only in the storage 110.

The mode 402 is an HDD normal mode. In the mode 402, the operation is performed by using both the storage 110 including the SSD and the storage 111 including the HDD. By validating the HDD option, the activation mode is switched from the mode 401 to the mode 402. Then, the image forming apparatus 100 is activated in the HDD normal mode for the next activation time.

When the activation mode information indicates the mode 402, the image forming apparatus 100 uses the storage 110 as the system area, and further uses the storage 111 as the data area. In this case, data requiring security management such as image data or a user setting is stored only in the storage 111.

The mode 403 is an HDD failure mode. In the mode 403, the operation is performed by using only the storage 110 including the SSD, and the storage 111 including the HDD is detected but is not used. When the HDD option indicates an abnormality, the activation mode is switched from the mode 402 to the mode 403. Then, the image forming apparatus 100 is activated in the mode 403 for the next activation time. In this case, the image forming apparatus 100 uses the storage 110 as the system area and the data area.

In the mode 403, an HDD error screen is displayed on the touch panel 106 to control the operation so that the user cannot create and update the data. The processing is an example of the degeneration processing. When the mode is shifted to the mode 403, a service engineer performs recovery operation of the HDD corresponding to the storage 111, thereby returning the activation mode to the HDD normal mode.

After shifting to the mode 403, the user can select the activation in the mode 401. The selection is described below.

The mode 404 is an operation limit mode. In the mode 404, the operation is performed by using only the storage 110 including the SSD. The user operates a button displayed on the touch panel 106, thereby selecting the activation in the mode 404. In the mode 404, the image forming apparatus 100 is operated by using only the storage 110 including the SSD as the system area and the data area, and the data area in the SSD is not updated.

In the mode 404, the CPU 101 is activated in a status in which the operation is limited so that no operations for updating the data area in the storage 110 are selected by the user. This is also an example of the degeneration processing.

More specifically, the CPU 101 controls an image storage button, a copy-number setting button, a sort setting button, storage image operation buttons, and an operation screen of change of setting, and an operation screen of held jobs, to be gray-out or non-displayed. The operation limit mode is specifically described in a second exemplary embodiment.

Next, the activation mode determination processing is described with reference to a flowchart in FIG. 5. The activation mode determination processing is executed just before ending the operation of the image forming apparatus 100.

Figure 5:
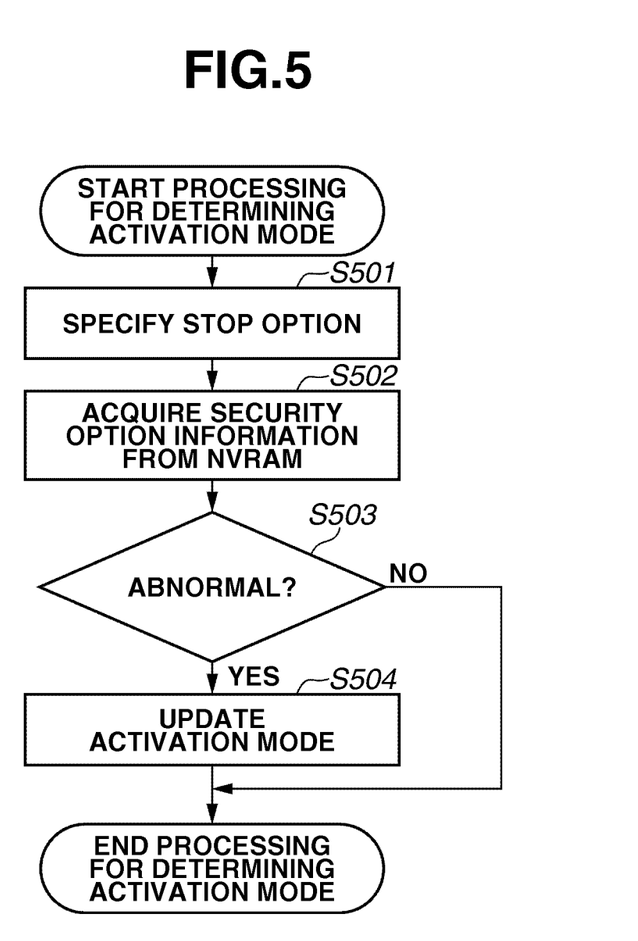
FIG. 5 is a flowchart illustrating a control procedure of the image forming apparatus.

FIG. 5 is a flowchart illustrating a control procedure of the image forming apparatus according to the present exemplary embodiment. The example corresponds to the outline of a flow of the activation mode determination processing. Steps are realized by the CPU 101 loading a control program to the RAM 103 and realizing the loaded program.

In step S501, the CPU 101 performs abnormality detection processing to specify an option to be stopped. When a portion where the abnormality is detected is in the storage 111 or encryption controller 112, the CPU 101 specifies an option relating to the HDD option and sets the specified option as a stop target.

In step S502, the CPU 101 acquires security option information from the NVRAM 115 to specify the operation of the storage 111 or encryption controller 112. The security option information includes the software encryption option 304 and the hardware encryption option 305.

In step S503, the CPU 101 determines whether the abnormality is detected in step S501. When the abnormality is detected (YES in step S503), the processing proceeds to step S504. In step S504, the CPU 101 performs activation mode updating processing for updating the activation mode for the next activation time according to the abnormality detected in step S501 and the security option information obtained in step S502. Thus, the activation mode information in the NVRAM 116 is updated.

Figure 6:
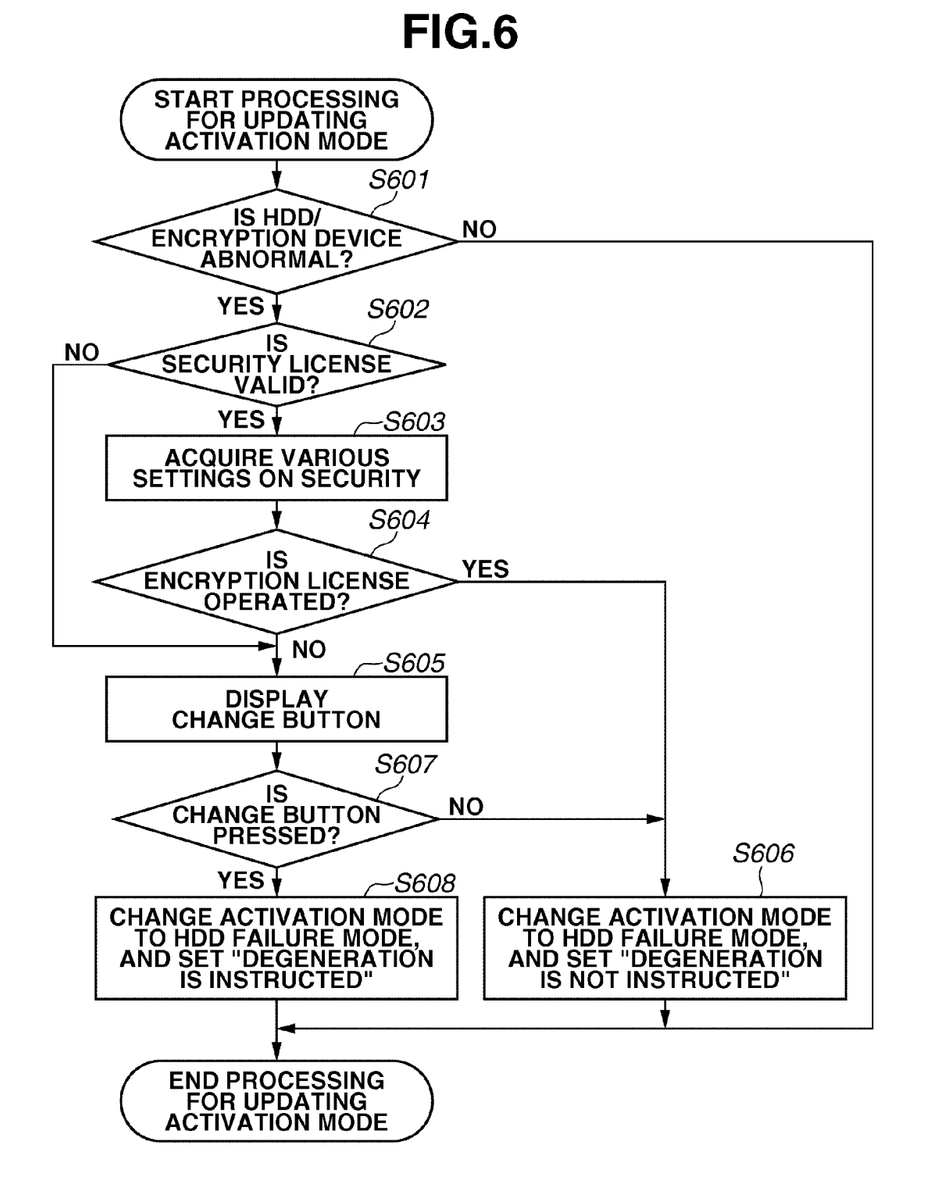
FIG. 6 is a flowchart illustrating a control procedure of the image forming apparatus.

The specific activation mode updating processing corresponding to the processing in step S504 is described with reference to a flowchart in FIG. 6. FIG. 6 is a flowchart illustrating a control procedure of the image forming apparatus according to the present exemplary embodiment. Steps are realized by the CPU 101 loading a control program to the RAM 103 and executing the loaded program.

In step S601, the CPU 101 determines, based on the abnormality detected in step S501, whether the generated abnormality relates to the HDD and/or encryption device. When the CPU 101 determines that the generated abnormality does not relate to the HDD and/or encryption device (NO in step S601), the CPU 101 ends the processing without updating the activation mode.

When the CPU 101 determines that the generated abnormality relates to the HDD and/or encryption device (YES in step S601), the CPU 101 proceeds to step S602. In step S602, the CPU 101 determines, based on the security option information acquired in step S502, whether the security license is valid.

When any of the software encryption option 304 and the hardware encryption option 305 is valid in the management table in FIG. 3, the CPU 101 determines that the security license is valid. When the CPU 101 determines that the security license is not valid (NO in step S602), the CPU 101 determines that the activation mode can be changed to the FLASH normal mode (corresponding to the mode 401 in FIG. 4), the processing proceeds to step S605.

When the CPU 101 determines that the security license is valid (YES in step S602), in step S603, the CPU 101 acquires various settings on the security from the NVRAM 115.

Various settings on the security include information indicating whether the encryption is actually used, e.g., whether an encryption key is generated, whether a data target to be encrypted exists, whether the number of records of the encrypted data is 1 or more, whether an encryption system is other than through-setting.

In step S604, the CPU 101 determines from the information acquired in step S603, whether the encryption license is actually operated. When the CPU 101 determines that the encryption license is actually operated (YES in step S604), in S606, the CPU 101 stores information indicating that degeneration is not instructed in the NVRAM 116. Then, the CPU 101 ends the operation mode determination processing. When the encryption license is actually operated, the mode is switched to the FLASH normal mode, thereby reducing the security level. Therefore, the degeneration to the FLASH normal mode is not performed.

In this case, the CPU 101 changes the activation mode indicated by the activation mode information in the NVRAM 116 to the HDD failure mode (the mode 403 in FIG. 4). At this time, the CPU 101 displays an error screen (not illustrated) indicating an error of the HDD or encryption device on the touch panel 106, and maintains the current status until the service engineer ends the recovery of the HDD.

When the CPU 101 determines that the encryption license is not operated (NO in step S604), the CPU 101 determines that the operation mode can be changed to the FLASH normal mode (the mode 401 illustrated in FIG. 4). Then, the processing proceeds to step S605. In other words, when the CPU 101 determines in step S602 that the security license is invalid or in step S604 that the encryption license is not operated, the processing proceeds to step S605.

In step S605, the CPU 101 determines that the mode can be switched to the FLASH normal mode (the mode 401 illustrated in FIG. 4), and displays a change button for shifting to the degeneration operation without using the HDD on the touch panel 106 (hereinafter, change button). In this case, an error screen illustrating an error of the HDD or encryption device and the change button are displayed on the touch panel 106 of the image forming apparatus 100 (not illustrated).

The user presses the change button displayed on the touch panel 106 to switch the operation mode to the FLASH normal mode (the mode 401 in FIG. 4) without waiting for the recovery of the HDD by the service engineer.

In step S607, the CPU 101 determines whether the user presses the change button. When the CPU 101 determines that the user presses the change button (YES in step S607), in step S608, the CPU 101 changes the activation mode indicated by the activation mode information in the NVRAM 116 to the HDD failure mode, and stores information in the NVRAM 116 indicating that the degeneration is instructed.

When the CPU 101 determines that the user has not pressed the change button (NO in step S607), in step S606, the CPU 101 changes the activation mode indicated by the activation mode information in the NVRAM 116 to the HDD failure mode, and stores information in the NVRAM 116 indicating that the degeneration is not instructed.

When step S606 or S608 is not executed, the activation mode is not changed and the activation mode information stored in the NVRAM 116 indicates the FLASH normal mode or the HDD normal mode.

Figure 7:
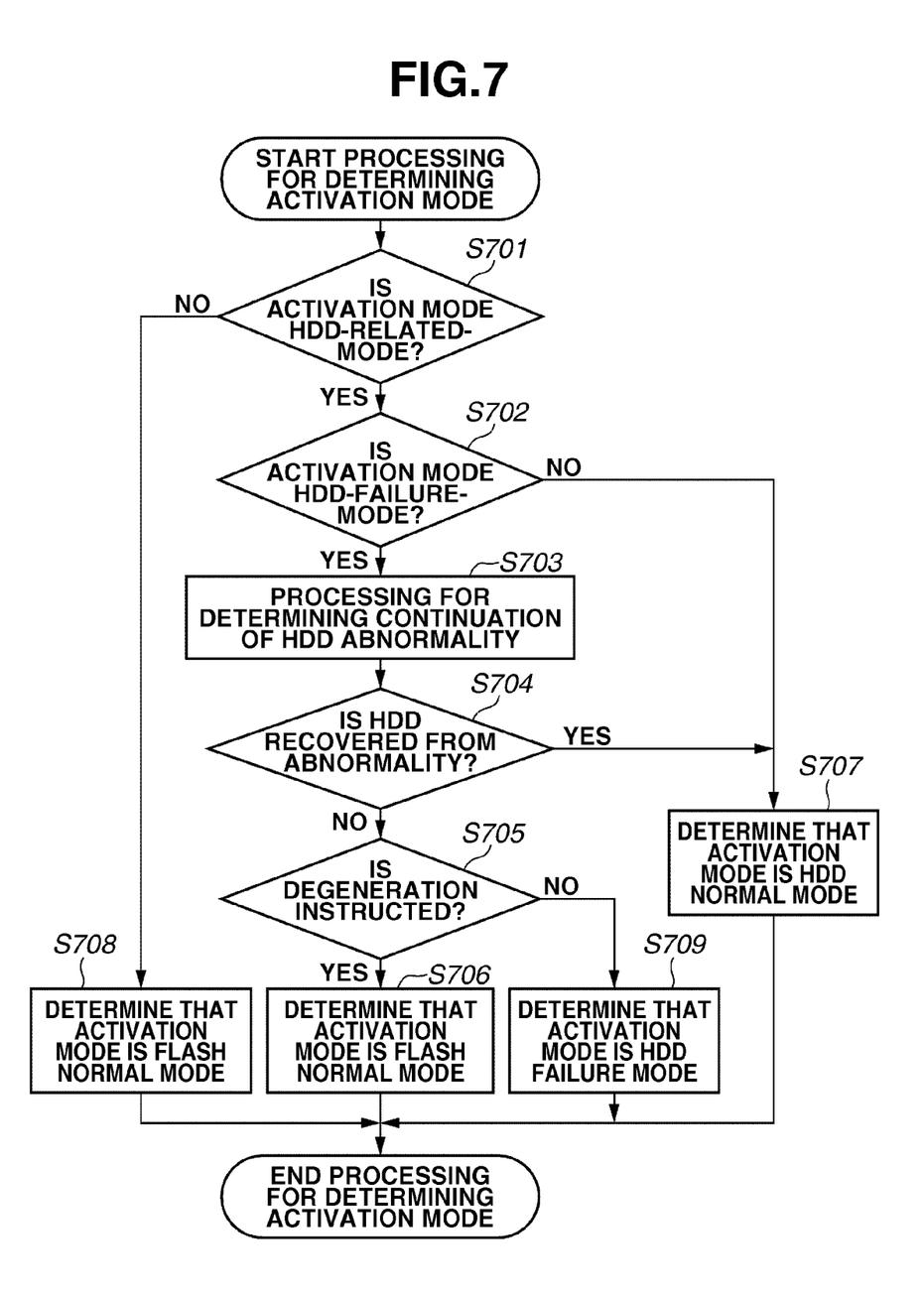
FIG. 7 is a flowchart illustrating a control procedure of the image forming apparatus.

Next, the activation mode determination processing when the image forming apparatus 100 is activated is described with reference to a flowchart in FIG. 7. FIG. 7 illustrates a control procedure of the image forming apparatus according to the present exemplary embodiment. Steps are realized by the CPU 101 loading a control program to the RAM 103 and executing the loaded program. When activating the image forming apparatus 100, the CPU 101 refers to the activation mode information in the NVRAM 116 to determine a storage device necessary at the activation time.

In step S701, the CPU 101 reads the activation mode information in the NVRAM 116, and determines whether the activation mode is the mode (HDD normal mode or HDD failure mode) to use the HDD. The mode not to use the HDD is operated by using only the storage 110, and the mode to use the HDD is operated by using the storage 111.

When the CPU 101 determines that the activation mode is the activation mode without using the HDD (NO in step S701), in step S708, the CPU 101 determines that the activation mode is the FLASH normal mode (the mode 401 in FIG. 4), and then ends the determination processing. When the CPU 101 determines the activation mode using the HDD (YES in step S701), in step S702, the CPU 101 determines whether the activation mode is the HDD failure mode (the mode 403 illustrated in FIG. 4).

When the CPU 101 determines that the activation mode is the HDD failure mode (the mode 403 in FIG. 4) (YES in step S702), in step S703, the CPU 101 executes processing for determining whether the abnormality of the HDD currently continues. When the CPU 101 determines that the activation mode is not the HDD failure mode (NO in step S702), the CPU 101 proceeds to step S707.

The processing for determining whether the abnormality of the HDD continues in step S703 includes detection of a block device, detection of an abnormality of a file system, mount test processing, and file read/write test processing. Further, the processing may include determination processing of file generation/deletion test processing and acquisition of self-monitoring, analysis, and reporting technology (SMART) information.

In step S704, the CPU 101 determines based on the determination processing executed in step S703, whether the HDD has been recovered. When the CPU 101 determines that the test performed in step S703 passes without fails, the CPU 101 determines that the HDD is recovered from the abnormality. In this case (YES in step S704), in step S707, the CPU 101 determines that the activation mode is the HDD normal mode (the mode 402 in FIG. 4), and ends the activation mode determination processing.

On the other hand, when the CPU 101 determines that the HDD is not recovered from the abnormality (NO in step S704), in step S705, the CPU 101 determines whether the degeneration is instructed. That is, the CPU 101 determines whether information indicating that the degeneration is instructed is stored in the NVRAM 116. When the CPU 101 determines that the degeneration is not instructed (NO in step S705), in step S709, the CPU 101 determines that the activation mode is the HDD failure mode (the mode 403 illustrated in FIG. 4), and ends the activation mode determination processing.

On the other hand, when the CPU 101 determines that the degeneration is instructed (YES in step S705), in step S706, the CPU 101 determines that the activation mode is the FLASH normal mode (the mode 401 illustrated in FIG. 4), and ends the activation mode determination processing.

After ending the activation mode determination processing, the image forming apparatus 100 is activated in the determined activation mode. Consequently, when the HDD is not available due to a failure in the image forming apparatus 100 using the HDD which can be in the security operation, the degeneration processing is properly executed according to whether or not the operation of the security is performed.

Further, when processing that causes a problem on the security is operated, the image forming apparatus 100 is controlled to prevent the execution of data processing until the recovery of the HDD. Even if the SSD is detached, it is possible to prevent the user information stored in the SSD from being sneaked by the third party.

Further, if a failure in the HDD occurs, when the security operation is not executed in the HDD, the image processing is executed by using the SSD. Therefore, down time in which the user can use no function of the image forming apparatus 100 is prevented.

According to the first exemplary embodiment, the case of changing the operation mode to the FLASH normal mode in step S706 when the CPU 101 determines that the degeneration is instructed, is described. Further, according to the first exemplary embodiment, the case of changing the activation mode to the HDD failure mode when the encryption license is operated, is described.

According to a second exemplary embodiment of the present invention, even if the encryption license is operated, the activation mode can be changed to the operation limit mode. Thus, even if the abnormality is generated in the HDD and/or encryption device and the encryption license is operated, the user can use the image forming apparatus 100 within a range for keeping the security to some degree.

Then, in the second exemplary embodiment, the flowchart illustrated in FIG. 6 is changed as follows. When the CPU 101 determines that the encryption license is operated (YES in step S604), the CPU 101 displays the change button on the touch panel 106. When the user presses the change button (YES in step S607), the CPU 101 changes the activation mode indicated by the activation mode information stored in the NVRAM 116 to the HDD failure mode, and stores information indicating that the degeneration is instructed (degeneration is performed) and information indicating that the degeneration to the operation limit mode is performed in the NVRAM 116.

When the user does not press the change button (NO in step S607), the CPU 101 changes the activation mode indicated by the activation mode information in the NVRAM 116 to the HDD failure mode, and stores information indicating that the degeneration is not instructed (degeneration is not performed) to the NVRAM 116.

Figure 8:
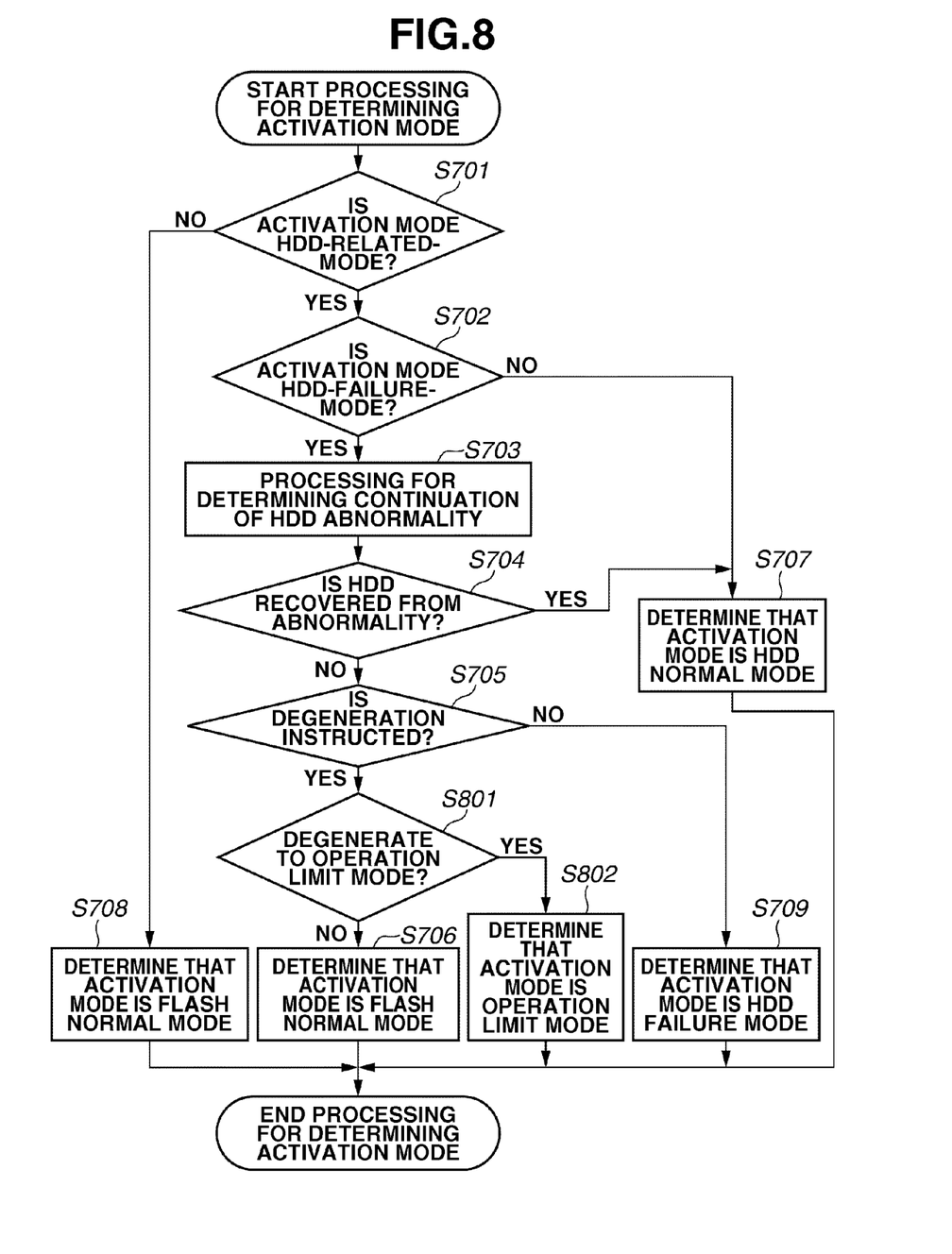
FIG. 8 is a flowchart illustrating a control procedure of the image forming apparatus.

According to the second exemplary embodiment, the image forming apparatus 100 executes the activation mode determination processing in FIG. 8.

FIG. 8 is a flowchart illustrating a control procedure of an image forming apparatus according to the present exemplary embodiment. Steps are realized by the CPU 101 loading the control program to the RAM 103 and executing the loaded program. When the image forming apparatus 100 is activated, as described above, the CPU 101 refers to the activation mode stored in the NVRAM 116 to determine a storage device required for the activation.

Hereinbelow, processing according to the present exemplary embodiment, different from that illustrated in FIG. 7 according to the first exemplary embodiment, will be described. When the CPU 101 determines in step S705 that the degeneration is instructed, in step S801, the CPU 101 determines whether the degeneration to the operation limit mode is performed. In other words, the CPU 101 determines that information indicating the degeneration to the operation limit mode is stored in the NVRAM 116.

When the degeneration to the operation limit mode is not performed (NO in step S801), in step S706, the CPU 101 determines that the activation mode is the FLASH normal mode (the mode 401 illustrated in FIG. 4). On the other hand, When the degeneration to the operation limit mode is performed (YES in step S801), in step S802, the CPU 101 determines that the activation mode is the operation limit mode (the mode 404 illustrated in FIG. 4).

Figure 9:
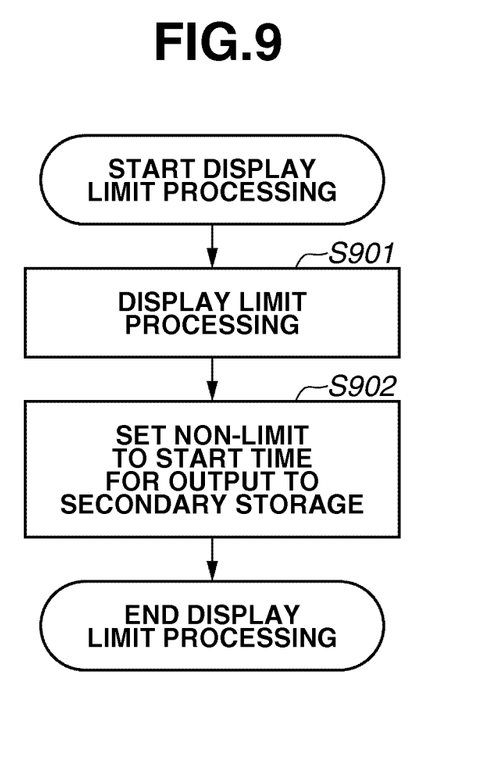
FIG. 9 is a flowchart illustrating a control procedure of the image forming apparatus.

Next, the operation limit mode in the image forming apparatus 100 is described with reference to a flowchart illustrated in FIG. 9. FIG. 9 is a flowchart of a control procedure of the image forming apparatus 100 according to the present exemplary embodiment. An example in FIG. 9 corresponds to the outline of display limit processing in the operation limit mode. Steps are realized by the CPU 101 loading the control program to the RAM 103 and executing the loaded program.

According to the second exemplary embodiment, when the CPU 101 determines that the HDD is in trouble, the encryption is operated, and the degeneration is instructed, the image forming apparatus 100 is activated in the operation limit mode.

In step S901, the CPU 101 executes the display limit processing. The display limit processing includes non-display processing of an image storage button, a copy-number designation button, a sort designation button, buttons relating to storage image operation, a setting change button, and buttons relating to a nonvolatile job. The nonvolatile job includes a transmission job and a reservation job with a timer.

In step S902, the CPU 101 sets non-limit to a start timer for setting an output start time (output start time to secondary storage) to the storage 110, and ends the present processing. According to this, an output of the image data on the RAM 103 to the storage 110 is not performed even if the printer 113 does not obtain the image data from the RAM 103 for a long time.

With this setting, the scanner 114 reads the document, or the NIC 104 receives PDL data. Then, the image data stored in the RAM 103 is processed via the image processing controller 117 as follows. Specifically, the CPU 101 controls the operation to prevent an output of the image data on the RAM 103 to the storage 110 even if it takes a predetermined time to obtain data by the printer 113.

Therefore, in the operation limit mode, it is limited to write temporary data (image data in the RAM 103) to the storage 110.

According to the present exemplary embodiment, by determining the security operation status set to the image forming apparatus 100, the deterioration of security level is prevented even if the storage device involved in the security operation is in trouble. Further, with the determination of any of the activation modes, a user-available degeneration function can be selected.

According to the exemplary embodiments of the present invention, when one of a plurality of storage devices is not available, the execution of operation mode can be switched according to the option status.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-145144 filed Jun. 25, 2010, which is hereby incorporated by reference herein in its entirety.

What is claimed is:

1. A data processing apparatus that can respectively store data to a first storage unit and a second storage unit, the data processing apparatus comprising:
a control unit configured to execute a first operation mode for limiting data processing using the second storage unit and enabling data processing using the first storage unit in a case where the second storage unit is not available and an option for storing encrypted data in the second storage unit is not used, and execute a second operation mode for limiting the data processing using the first storage unit and the data processing using the second storage unit, in a case where the second storage unit is not available and the option is used.

2. The data processing apparatus according to claim 1, wherein the control unit limits an execution job and executes the second operation mode for limiting data stored in the first storage unit in a case where the second storage unit is not available and the option is not used.

3. The data processing apparatus according to claim 1, wherein the first storage unit is configured with a solid state drive and the second storage unit is configured with a hard disk drive.

4. The data processing apparatus according to claim 1, further comprising:
a selection unit configured to allow a user to select whether the first operation mode is executed, in a case where the second storage unit is not available and the option is not used,
wherein the control unit executes the first operation mode in a case where the user selects the execution of the first operation mode, and executes the second operation mode in a case where the user does not select the execution of the first operation mode.

5. The data processing apparatus according to claim 1, further comprising:
a holding unit configured to hold option information indicating whether the option for storing the encrypted data to the second storage unit is valid; and
a determination unit configured to determine, based on the option information, whether the option is used.

6. The data processing apparatus according to claim 1, wherein the case where the second storage unit is not available includes a case where an abnormality occurs in the second storage unit or a case where an abnormality occurs in encryption unit configured to encrypt data to be stored in the second storage unit.

7. A data processing apparatus that can respectively store data to a first storage unit and a second storage unit, the data processing apparatus comprising:
a control unit configured to execute a first operation mode for limiting data processing using the second storage unit and enabling data processing using the first storage unit in a case where the second storage unit is not available and an option for enhancing security of data to be used by the data processing apparatus is not used, and execute a second operation mode for limiting the data processing using the first storage unit and the data processing using the second storage unit in a case where the second storage unit is not available and the option is used.

8. A control method of a data processing apparatus that can respectively store data to a first storage unit and a second storage unit, the control method comprising:
controlling execution of a first operation mode for limiting data processing using the second storage unit and enabling data processing using the first storage unit, in a case where the second storage unit is not available and an option for storing encrypted data in the second storage unit is not used, and execution of a second operation mode for limiting the data processing using the first storage unit and the data processing using the second storage unit, in a case where the second storage unit is not available and the option is used.

9. The control method of the data processing apparatus according to claim 8, controlling execution of the second operation mode for limiting an execution job and further limiting data to be stored in the first storage unit, in a case where the second storage unit is not available and the option is not used.

10. A non-transitory computer-readable recording medium that stores a program for causing a computer to execute the control method of the data processing apparatus according to claim 8.

* * * * *